(12) United States Patent
Nagai (10) Patent No.: US 11,812,006 B2
(45) Date of Patent: Nov. 7, 2023

(54) COLORIMETRIC METHOD AND COLORIMETRIC SYSTEM

(71) Applicant: SEIKO EPSON CORPORATION, Tokyo (JP)

(72) Inventor: Takashi Nagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,401

(22) Filed: Feb. 9, 2022

(65) Prior Publication Data

US 2022/0272233 A1 Aug. 25, 2022

(30) Foreign Application Priority Data

Feb. 12, 2021 (JP) ................................. 2021-021196

(51) Int. Cl.
  *H04N 1/64* (2006.01)
  *G01J 3/02* (2006.01)
  *G01J 3/46* (2006.01)
  *G01N 21/25* (2006.01)

(52) U.S. Cl.
  CPC .............. *H04N 1/64* (2013.01); *G01J 3/0208* (2013.01); *G01J 3/462* (2013.01); *G01N 21/251* (2013.01)

(58) Field of Classification Search
  None
  See application file for complete search history.

(56) References Cited

U.S. PATENT DOCUMENTS

2020/0136886 A1 4/2020 Tanimura
2022/0012553 A1* 1/2022 Li ........................ G06K 15/007

FOREIGN PATENT DOCUMENTS

JP 2020-071083 A 5/2020

* cited by examiner

*Primary Examiner* — Lennin R Rodriguezgonzalez
(74) *Attorney, Agent, or Firm* — WORKMAN NYDEGGER (57) ABSTRACT

A colorimetric method includes a server generating a colorimetric job including information about an instruction to perform colorimetry and a colorimetry measurement condition, the server storing the colorimetric job, the server transmitting the colorimetric job, a colorimeter receiving the colorimetric job, and the colorimeter performing colorimetry based on the colorimetric job when the colorimetric job is selected by the colorimeter.

13 Claims, 10 Drawing Sheets

| A | B | C | D | |
|---|---|---|---|---|
| #1 | job1.pdf | #100 | None | DJ_1 |
| | | #101 | CGATS101.dat | |
| #2 | job2.pdf | #102 | CGATS102.dat | DJ_2 |

COLORIMETRIC METHOD AND COLORIMETRIC SYSTEM

The present application is based on, and claims priority from JP Application Serial Number 2021-021196, filed Feb. 12, 2021, the disclosure of which is hereby incorporated by reference herein in its entirety.

BACKGROUND

1. Technical Field

The present disclosure relates to a colorimetric method and a colorimetric system.

2. Related Art

In a printing device that performs printing by an ink jet method, an electrophotographic method, or the like, color matching is generally performed to bring the color of a printed image closer to a desired color. In this color matching, for example, colorimetry as disclosed in JP-A-2020-71083 is performed.

In the colorimetric method described in JP-A-2020-71083, a spectroscopic colorimetric device performs colorimetry for a proof chart or the like printed on paper by a printing machine. This colorimetry is performed based on the operation of the spectroscopic colorimetric device by the user. A user terminal device is communicably connected to the spectroscopic colorimetric device. A cloud server is communicably connected to this user terminal device. Such a user terminal device or a cloud server manages the data obtained by the colorimetry performed by the spectroscopic colorimetric device.

In the colorimetric method described in JP-A-2020-71083, the user has a low degree of freedom in the operation time or the operation place of colorimetry, and it is necessary to be proficient in the operation required for colorimetry to some extent. As described above, the colorimetric method in the related art has a problem of lacking usability.

SUMMARY

According to an aspect of the present disclosure, a colorimetric method includes a server generating a colorimetric job including information about an instruction to perform colorimetry and a colorimetry measurement condition, the server storing the colorimetric job, the server transmitting the colorimetric job, a colorimeter receiving the colorimetric job, and the colorimeter performing colorimetry based on the colorimetric job when the colorimetric job is selected by the colorimeter.

According to another aspect of the present disclosure, a colorimetric system includes a server, and a colorimeter, wherein the server includes a generation unit that generates a colorimetric job including information about an instruction to perform colorimetry and a colorimetry measurement condition, a storage unit that stores the colorimetric job, and a first communication unit that transmits the colorimetric job, and wherein the colorimeter includes a second communication unit that receives the colorimetric job and a colorimetry unit that performs colorimetry based on the colorimetric job when the colorimetric job is selected.

DESCRIPTION OF EXEMPLARY EMBODIMENTS

Hereinafter, preferred embodiments according to the present disclosure will be described with reference to the accompanying drawings. In the drawings, the dimensions and scales of each part are appropriately different from the actual ones, and some parts are schematically shown for easy understanding. Further, the scope of the present disclosure is not limited to these forms unless it is stated in the following description that the present disclosure is particularly limited.

1. First Embodiment 1-1. Colorimetric System

Figure 1:
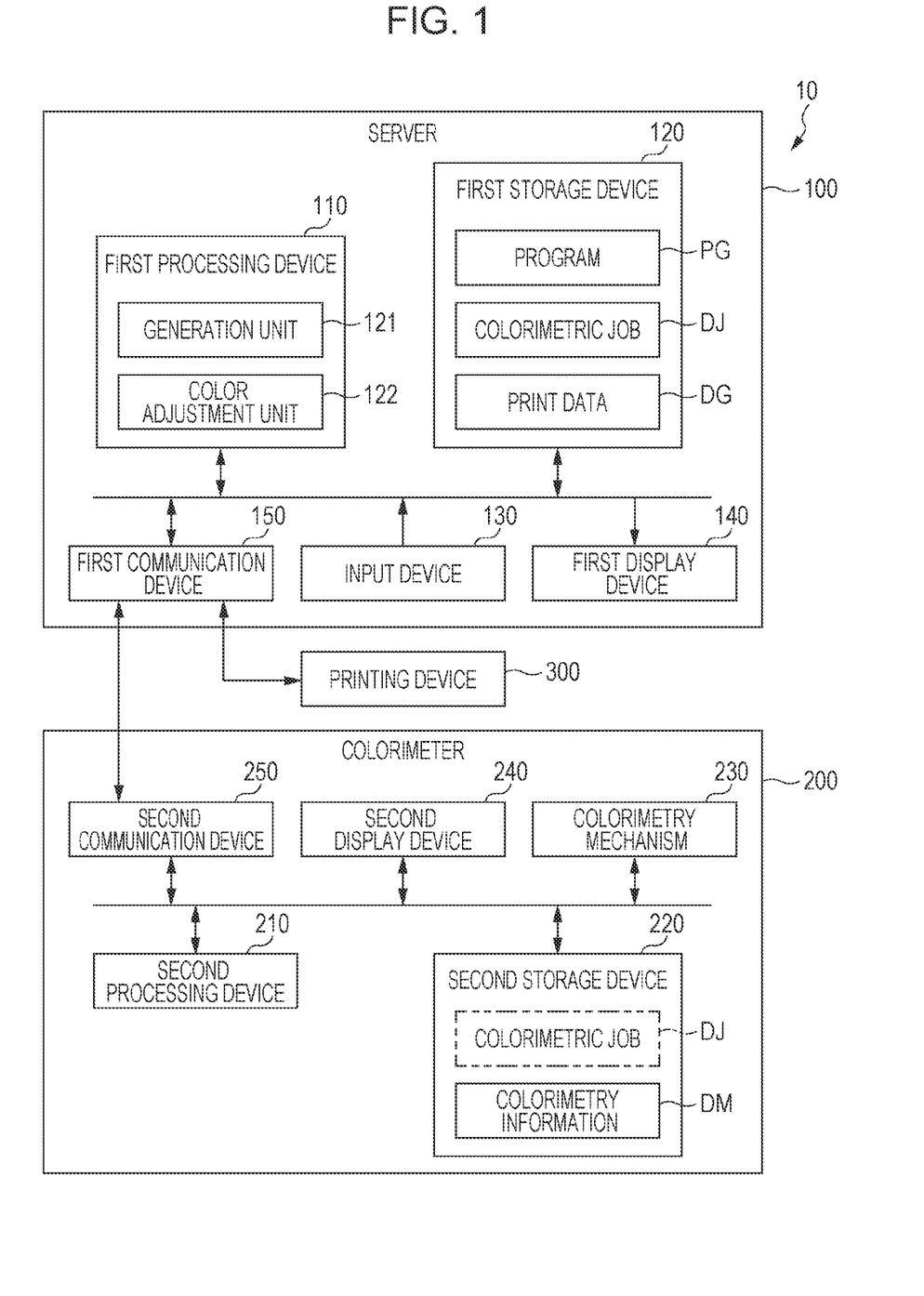
FIG. 1 is a diagram illustrating a configuration example of a colorimetric system according to the first embodiment.

FIG. 1 is a diagram illustrating a configuration example of a colorimetric system 10 according to the first embodiment. The colorimetric system 10 performs, with a colorimeter 200, colorimetry based on a colorimetric job DJ generated by a server 100. In the present embodiment, in addition to the colorimetry, the colorimetric system 10 performs, with the server 100, a color adjustment of a predetermined color such as a spot color of print data DG based on the result of the colorimetry.

The colorimetric system 10 includes the server 100, the colorimeter 200, and a printing device 300. The server 100 is communicably connected to each of the colorimeter 200 and the printing device 300. This connection may be wireless or wired, or may be mediated by a network such as the Internet or a local area network (LAN).

The server 100 is a computer that generates the colorimetric job DJ. Specifically, the server 100 has a function of accepting input of information necessary for generating the colorimetric job DJ, a function of generating the colorimetric job DJ based on the information, and a function of storing the colorimetric job DJ, and a function of transmitting the colorimetric job DJ to the colorimeter 200.

In the present embodiment, in addition to the above-mentioned functions, the server 100 has a function of performing a color adjustment of the print data DG based on a result of colorimetry performed by the colorimeter 200 and a function of causing the printing device 300 to perform printing based on the print data DG after the color adjustment.

As illustrated in FIG. 1, the server 100 includes a first processing device 110, a first storage device 120, which is an example of a "storage unit", an input device 130, a first display device 140, and a first communication device 150, which is an example of a "first communication unit". Hereinafter, respective units of the server 100 will be described in order.

The first processing device 110 is a device having a function of controlling respective units of the server 100 and a function of processing various pieces of data. The first processing device 110 includes, for example, a processor such as a central processing unit (CPU). The first processing device 110 may be composed of a single processor or a plurality of processors. In addition, some or all of the functions of the first processing device 110 may be implemented by hardware such as a digital signal processor (DSP), an application specific integrated circuit (ASIC), a programmable logic device (PLD), and a field programmable gate array (FPGA).

The first storage device 120 is a device that stores various programs executed by the first processing device 110 and various pieces of data processed by the first processing device 110. The first storage device 120 includes, for example, a hard disk drive or a semiconductor memory. Part or all of the first storage device 120 may be provided in a storage device or a terminal device outside the server 100.

The first storage device 120 of the present embodiment stores a program PG, the colorimetric job DJ, and the print data DG. The program PG is a program that causes the server 100 to perform a colorimetric method to be described later.

The colorimetric job DJ is operation information about colorimetry performed by the colorimeter 200, and includes information about an instruction to perform the colorimetry and a colorimetry measurement condition. Here, the colorimetric job DJ may include operation information about an operation other than colorimetry, such as printing accompanying the colorimetry operation, in addition to information about an instruction to perform the colorimetry and a colorimetry measurement condition. The colorimetric job DJ is generated by a generation unit 121 to described later. The colorimetric job DJ will be described in detail later.

The print data DG is image data on which a printing process is to be performed by the printing device 300. The print data DG is created by, for example, image editing software. Specifically, the print data DG is, for example, a file format or various vector format data in a page description language such as a PostScript, a portable document format (PDF), or an XML paper specification (XPS), or raster format data. The print data DG may be image data created by the server 100, or may be image data created outside the server 100. The print data DG may be data itself created by image editing software or the like, or may be data obtained by subjecting the data to a rasterization process or the like. Further, in the present embodiment, the content of the print data DG is not particularly limited and is any content.

The input device 130 is a device that accepts operations from the operator of the server 100. In the present embodiment, by operating the input device 130, the operator of the server 100 inputs information necessary for generating the colorimetric job DJ to the server 100. The input device 130 includes, for example, a pointing device such as a touch pad, a touch panel, or a mouse. Here, when the input device 130 includes a touch panel, the input device 130 may also serve as the first display device 140.

The first display device 140 is a device that performs a display under the control of the first processing device 110. Specifically, the first display device 140 displays, for example, an image for assisting the input of information necessary for generating the colorimetric job DJ, and displays an image showing the progress of colorimetry based on the colorimetric job DJ. The first display device 140 is composed of various display panels such as a liquid crystal display panel or an organic electro-luminescence (EL) display panel, for example. The first display device 140 may be provided outside the server 100.

The first communication device 150 is a communication circuit communicatively connected to each of the colorimeter 200 and the printing device 300. The first communication device 150 includes interfaces such as a Universal Serial Bus (USB) and a local area network (LAN), for example. The first communication device 150 may be wirelessly connected to the colorimeter 200 or the printing device 300 by, for example, Wi-Fi or Bluetooth, or may be connected to the colorimeter 200 or the printing device 300 via a local area network (LAN), the Internet, or the like. Wi-Fi and Bluetooth are registered trademarks.

In the above server 100, the first processing device 110 reads the program PG from the first storage device 120 and executes the program. By executing the program, the first processing device 110 functions as the generation unit 121 and a color adjustment unit 122.

The generation unit 121 receives the information necessary for generating the colorimetric job DJ based on the operation of the input device 130 by the user, and then generates the colorimetric job DJ based on the information. Further, the generation unit 121 causes the first communication device 150 to perform a process of transmitting the colorimetric job DJ after storing the generated colorimetric job DJ in the first storage device 120. The color adjustment unit 122 performs the color adjustment of the print data DG based on the result of the colorimetry performed by the colorimeter 200. Further, the color adjustment unit 122 causes the printing device 300 to perform a process of perform printing based on the print data DG after color adjustment.

The colorimeter 200 is a device such as a spectroscopic colorimeter, a camera, or a scanner that reads an object for colorimetry. Colorimetry information DM is generated by reading the object for colorimetry. In the present embodiment, the object is a print surface of a predetermined print medium on which a predetermined color of print data DG is printed. Here, printing on the object may be performed by the printing device 300 or may be performed by a printer other than the printing device 300. When printing on the object is performed by a printer other than the printing device 300, the object may be an existing object such as an external signboard, for example.

As illustrated in FIG. 1, the colorimeter 200 includes a second processing device 210, a second storage device 220, a colorimetry mechanism 230 which is an example of a "colorimetry unit", a second display device 240, and a second communication device 250 which is an example of a "second communication unit". Hereinafter, respective units of the colorimeter 200 will be described in order.

The second processing device 210 is a device having a function of controlling respective units of the colorimeter 200 and a function of processing various pieces of data. The second processing device 210 includes, for example, a processor such as a CPU. The second processing device 210 may be composed of a single processor or a plurality of processors. Further, some or all of the functions of the second processing device 210 may be implemented by hardware such as a DSP, an ASIC, a PLD, and a FPGA.

The second storage device 220 is a device that stores various programs executed by the second processing device 210 and various pieces of data processed by the second processing device 210. The second storage device 220 includes, for example, a hard disk drive or a semiconductor memory. Part or all of the second storage device 220 may be provided in a storage device or a terminal device outside the colorimeter 200.

The second storage device 220 stores the colorimetry information DM. The colorimetry information DM is information obtained as a result of colorimetry performed by the colorimetry mechanism 230 as described above. Further, the second storage device 220 temporarily stores the colorimetric job DJ from the server 100 described above.

The colorimetry mechanism 230 is an assembly having an imaging optical system and an imaging element. The imaging optical system is an optical system including at least one imaging lens, and may include various optical elements such as a prism, or may include a zoom lens, a focus lens, or the like. The imaging element is, for example, a charge coupled device (CCD) image sensor, a complementary MOS (CMOS) image sensor, or the like. In addition to the imaging optical system and the imaging element, the colorimetry mechanism 230 may have a moving mechanism that changes the relative positional relationship between the imaging range and the object to be imaged, if necessary.

The colorimetry mechanism 230 may have a spectroscopic function. In this case, for example, the imaging optical system may include a diffraction grating, a tunable filter, or the like. The image captured by the colorimetry mechanism 230 may be full color or mono-color. When the captured image is full color, for example, imaging information represented by a tristimulus value in the XYZ color system for each pixel of the captured image is obtained as a result of colorimetry performed by the colorimeter 200. When the captured image is mono-color, for example, imaging information represented by a brightness value for each pixel of the captured image is obtained as a result of colorimetry performed by the colorimeter 200. However, the captured image is preferably full color.

The second display device 240 is a device that performs a display under the control of the second processing device 210. Specifically, the second display device 240 displays, for example, an image indicating an operation instruction or an operation content of colorimetry based on the colorimetric job DJ. The second display device 240 is composed of various display panels such as a liquid crystal display panel or an organic EL display panel, for example. The second display device 240 may be provided outside the colorimeter 200.

The second communication device 250 is a communication circuit that is communicably connected to the server 100. The second communication device 250 includes interfaces such as a USB and a LAN, for example. The second communication device 250 may be wirelessly connected to the server 100 by, for example, Wi-Fi or Bluetooth, or may be connected to the server 100 via a LAN, the Internet, or the like.

Here, in order to ensure the security of communication when the second communication device 250 is connected to the first communication device 150 of the server 100, for example, the ID and the password for communication with the server 100 is input from the colorimeter 200 to the server 100 and then the one-time password displayed on the server 100 is input into the colorimeter 200.

The printing device 300 illustrated in FIG. 1 is a device that performs printing on a print medium under the control of the server 100. More specifically, the printing device 300 prints an image based on the print data DG input from the server 100 on the print medium. The print medium is not particularly limited, and includes, for example, various papers, various cloths, various films, and the like. The printing method of the printing device 300 is not particularly limited, and is, for example, an ink jet method, an electrophotographic method, or the like. Although not illustrated, the printing device 300 includes, for example, a printer engine of an ink jet method or an electrophotographic method, a transport mechanism that transports a print medium in a predetermined direction, and a control circuit that controls driving of these based on information from a server 100 or the like.

The printing device 300 described above performs printing using, for example, a color material such as a plurality of colors of ink or toner. Examples of the plurality of colors include process colors such as cyan, magenta, yellow and black. Further, the plurality of colors may include a spot color such as a fluorescent color or a metallic color. The number of colors of the color material is not particularly limited and is any number.

1-2. Colorimetric Method

Figure 2:
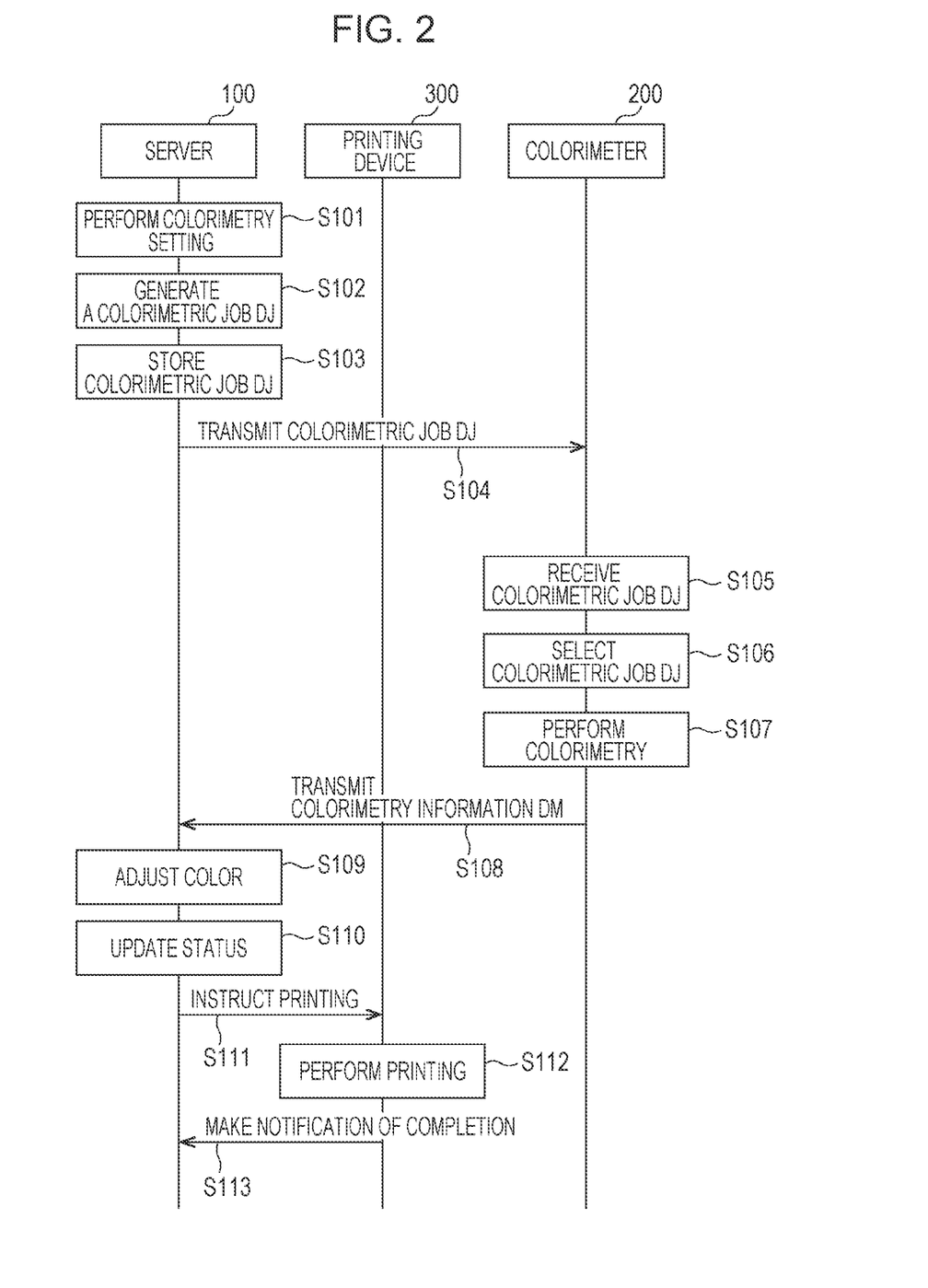
FIG. 2 is a diagram illustrating a colorimetric method according to the first embodiment.

FIG. 2 is a diagram illustrating a colorimetric method according to the first embodiment. The colorimetric method is performed using the colorimetric system 10 described above. In the colorimetric system 10, first, as illustrated in FIG. 2, in step S101, the server 100 makes setting for colorimetry. This setting is made by receiving information necessary for generating the colorimetric job DJ by the generation unit 121. The information is input to the server 100 based on an operation or the like of the input device 130 by the user. At this time, for example, an image for a graphical user interface (GUI) for assisting the input is displayed on the first display device 140.

In the present embodiment, the information required for generating the colorimetric job DJ includes information about the colorimetry setting of the colorimeter 200, information about the object for colorimetry, information about the print data DG, and information about the scope of color adjustment of the print data DG. Here, the information about the colorimetry setting of the colorimeter 200 is, for example, setting information about the M factor, the light source, the number of colorimetry objects, the number of colorimetry repetitions, and the like. The information about the object for colorimetry is, for example, information about the type of a print medium and the like. In the present embodiment, when the input of the print data DG is completed, a job ID is generated by the generation unit 121 as an identifier for identifying the colorimetric job DJ. Further, the range of color adjustment for the print data DG is set, for example, by displaying an image based on the print data DG on the first display device 140 and then designating the range and the color in the image.

Next, in step S102, the server 100 generates the colorimetric job DJ. This generation is performed by the generation unit 121 based on the information set in step S101 described above. Here, the colorimetric job DJ includes information about the above-mentioned job ID so that it can be distinguished from another colorimetric job DJ, and is generated for each job ID. In the present embodiment, the colorimetric job DJ includes information about the color ID as an identifier for identifying a color to be color-adjusted for the print data DG, in addition to the information about the job ID. Further, on the first display device 140 after the colorimetric job DJ is generated, for example, an image indicating the progress of colorimetry based on the colorimetric job DJ is displayed. A specific example of the colorimetric job DJ will be described with reference to FIG. 3 described later. Further, a specific example of the image displayed on the first display device 140 after the colorimetric job DJ is generated will be described with reference to FIG. 4 described later.

Then, in step S103, the server 100 stores the colorimetric job DJ in the first storage device 120. Then, in step S104, the server 100 transmits the colorimetric job DJ from the first communication device 150.

Next, in step S105, in the colorimeter 200, the second communication device 250 receives the colorimetric job DJ. At this time, the second display device 240 displays an image indicating an operation instruction or an operation content of colorimetry based on the colorimetric job DJ. A specific example of the image will be described with reference to FIG. 5 described later.

Then, in step S106, the colorimeter 200 selects the colorimetric job DJ. In this selection, for example, an image for selecting a colorimetric job DJ is displayed on the second display device 240, and then an operator of the colorimeter 200 operates an input device (not illustrated) of the colorimeter 200. Further, the selection is performed by reading a two-dimensional code or the like including information about the job ID printed on the chart. When the colorimeter 200 selects the colorimetric job DJ in this way, the colorimetry setting of the colorimeter 200 is automatically changed to the setting based on the colorimetric job DJ.

Next, in step S107, the colorimeter 200 performs colorimetry based on the colorimetric job DJ. At this time, the colorimeter 200 performs colorimetry on the object based on the colorimetric job DJ with the colorimetry setting based on the colorimetric job DJ. As a result of such colorimetry, the colorimetry information DM is obtained. The above-mentioned color ID is added to the colorimetry information DM. Therefore, the colorimetry information DM and the colorimetric job DJ can be associated with each other.

Then, in step S108, the colorimeter 200 transmits the colorimetry information DM from the second communication device 250. The colorimetry information DM transmitted from the colorimeter 200 is received by the first communication device 150 of the server 100. In the server 100, the first storage device 120 stores the colorimetry information DM as needed.

Next, in step S109, the server 100 performs the color adjustment of the print data DG based on the colorimetry information DM. This color adjustment is performed by replacing the predetermined color of the print data DG with the colorimetry value after the color adjustment unit 122 calculates the colorimetry value based on the colorimetry information DM.

After that, in step S110, the server 100 updates the status information indicating the progress of colorimetry based on the colorimetric job DJ. Specifically, the server 100 changes the progress display illustrated in FIG. 4 described later, for example, by deleting the performed colorimetric job DJ or adding to the performed colorimetric job DJ information indicating that the colorimetric job DJ was performed. Note that step S110 may be performed between step S108 and step S109 described above. Further, step S110 may be performed as needed or may be omitted.

Next, in step S111, the server 100 transmits, to the printing device 300, a print instruction for an image based on the print data DG after color adjustment. This transmission is performed by the color adjustment unit 122 causing the first communication device 150 to perform the process of transmitting the print instruction.

Next, in step S112, the printing device 300 prints the image based on the print data DG after color adjustment. Then, in step S113, the printing device 300 transmits, to the server 100, a completion notification indicating that the printing is completed.

As described above, the colorimetry based on the colorimetric job DJ and the color adjustment of the print data DG are performed. Hereinafter, a specific example of the colorimetric job DJ and an example of a display for the operator of the server 100 and the colorimeter 200 will be described in order.

Figure 3:
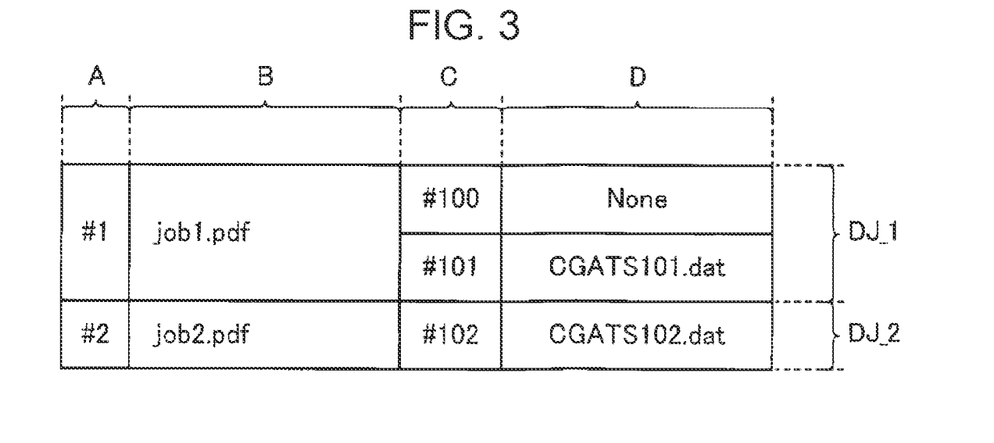
FIG. 3 is a diagram illustrating an example of a colorimetric job.

FIG. 3 is a diagram illustrating an example of the colorimetric job DJ generated in the above-mentioned step S102. In FIG. 3, two colorimetric jobs DJ_1 and a colorimetric job DJ_2 are exemplified as the colorimetric job DJ. Each of the colorimetric job DJ_1 and the colorimetric job DJ_2 includes information A indicating the job ID, information B indicating the print data DG, information C indicating the color ID, and information D indicating the colorimetry setting of the colorimeter 200 and the like. The format of the colorimetric job DJ is not limited to the example illustrated in FIG. 3.

Figure 4:
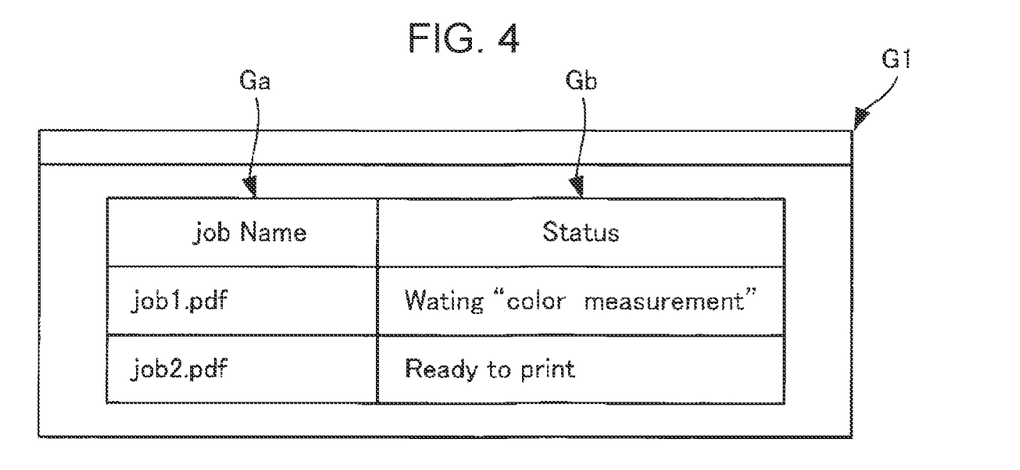
FIG. 4 is a diagram illustrating an example of a display on a server.

FIG. 4 is a diagram illustrating an example of a display on the server 100 after the above-mentioned step S102. FIG. 4 illustrates an image G1 displayed on the first display device 140 after generating the colorimetric job DJ_1 and the colorimetric job DJ_2 illustrated in FIG. 3 described above. In the example illustrated in FIG. 4, the image G1 includes an image Ga indicating the name of the colorimetric job DJ and an image Gb indicating the progress of colorimetry based on the colorimetric job DJ. Such an image G1 presents information about the colorimetric job DJ which was instructed to the operator of the server 100 and the progress of colorimetry based on the colorimetric job DJ. The display content of the image G1 is not limited to the example illustrated in FIG. 4, as long as necessary information can be presented to the operator of the server 100.

Figure 5:
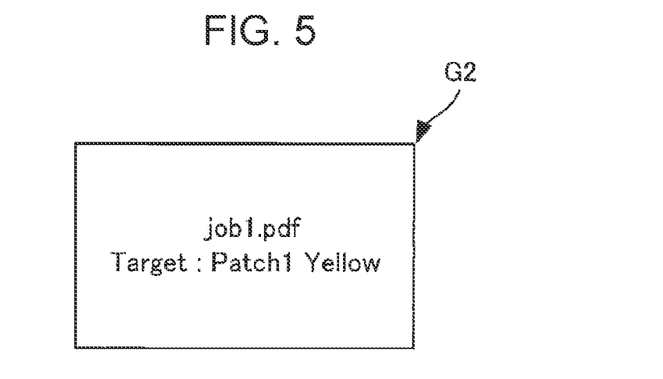
FIG. 5 is a diagram illustrating an example of a display on a colorimeter.

FIG. 5 is a diagram illustrating an example of a display by the colorimeter 200 in the above-mentioned step S105. FIG. 5 illustrates an image G2 displayed on the second display device 240 of the colorimeter 200 that has received the colorimetric job DJ_1 among the colorimetric job DJ_1 and the colorimetric job DJ_2 illustrated in FIG. 3 described above. In the example illustrated in FIG. 5, the name of the colorimetric job DJ and the color to be color-adjusted are displayed in the image G2. By this display, the operator of the colorimeter 200 is presented with the information necessary for colorimetry based on the colorimetric job DJ. The display content of the image G2 is not limited to the example illustrated in FIG. 5, as long as necessary information can be presented to the operator of the colorimeter 200.

As described above, the colorimetric system 10 performs the colorimetric method including the above-mentioned step S102, step S103, step S104, step S105 and step S107. As described above, in step S102, the server 100 generates the colorimetric job DJ including information about an instruction to perform colorimetry and a colorimetry measurement condition. In step S103, the server 100 stores the colorimetric job DJ. In step S104, the server 100 transmits the colorimetric job DJ. In step S105, the colorimeter 200 receives the colorimetric job DJ. In step S107, when the colorimetric job DJ is selected by the colorimeter 200, the colorimeter 200 performs colorimetry based on the colorimetric job DJ.

Here, the colorimetric system 10 includes the server 100 and at least one colorimeter 200, as described above. Here, the server 100 includes the generation unit 121 that generates the colorimetric job DJ, the first storage device 120 which is an example of a "storage unit" that stores the colorimetric job DJ, and the first communication device 150 which is an example of a "first communication unit" that transmits the colorimetric job DJ. On the other hand, at least one colorimeter 200 includes the second communication device 250 which is an example of the "second communication unit" that receives the colorimetric job DJ, and the colorimetry mechanism 230 which is an example of a "colorimetry unit" that performs colorimetry based on the colorimetric job DJ when the colorimetric job DJ is selected.

In the above colorimetric system 10, since the colorimetric job DJ is transmitted from the server 100 to the colorimeter 200, an operator of the server 100 is in charge of the setting operation related to an instruction to perform colorimetry and a colorimetry measurement condition, while an operator of the colorimeter 200 is in charge of the actual measurement operation of colorimetry. In this way, since the division of labor of colorimetry is possible, it is possible to increase the degree of freedom of operation time for colorimetry for the user, and it is not necessary for each person in charge to be proficient in all the operations required for colorimetry. For example, the operator of the server 100 does not need to be proficient in the actual measurement operation of the colorimeter 200, while the operator of the colorimeter 200 does not need to be proficient in the setting operation of colorimetry. Further, even when the colorimeter 200 is installed at a place different from that of the server 100, it is possible to perform colorimetry. Therefore, the user can have the increased degree of freedom of the operation place for colorimetry. As can be understood from the above, the colorimetric system 10 is superior in usability as compared with the colorimetric method in the related art that requires mastery of the colorimetry operation.

The server 100 includes the first display device 140 that displays the content of the colorimetric job DJ. Therefore, by displaying the content of the colorimetric job DJ on the first display device 140, the content can be presented to the operator of the server 100. Further, the colorimeter 200 includes the second display device 240 that displays the content of the colorimetric job DJ. Therefore, by displaying the content of the colorimetric job DJ on the second display device 240, the content can be presented to the operator of the colorimeter 200.

The server 100 includes the color adjustment unit 122 that performs the color adjustment of the print data DG based on the execution result of the colorimetry based on the colorimetric job DJ. Therefore, the colorimetric system 10 can be provided as a color adjustment system.

2. Second Embodiment

Hereinafter, a second embodiment of the present disclosure will be described. In the embodiment illustrated below, elements having the same actions and functions as those of the first embodiment will be denoted by the reference numerals used in the description of the first embodiment, and detailed description thereof will be appropriately omitted.

Figure 6:
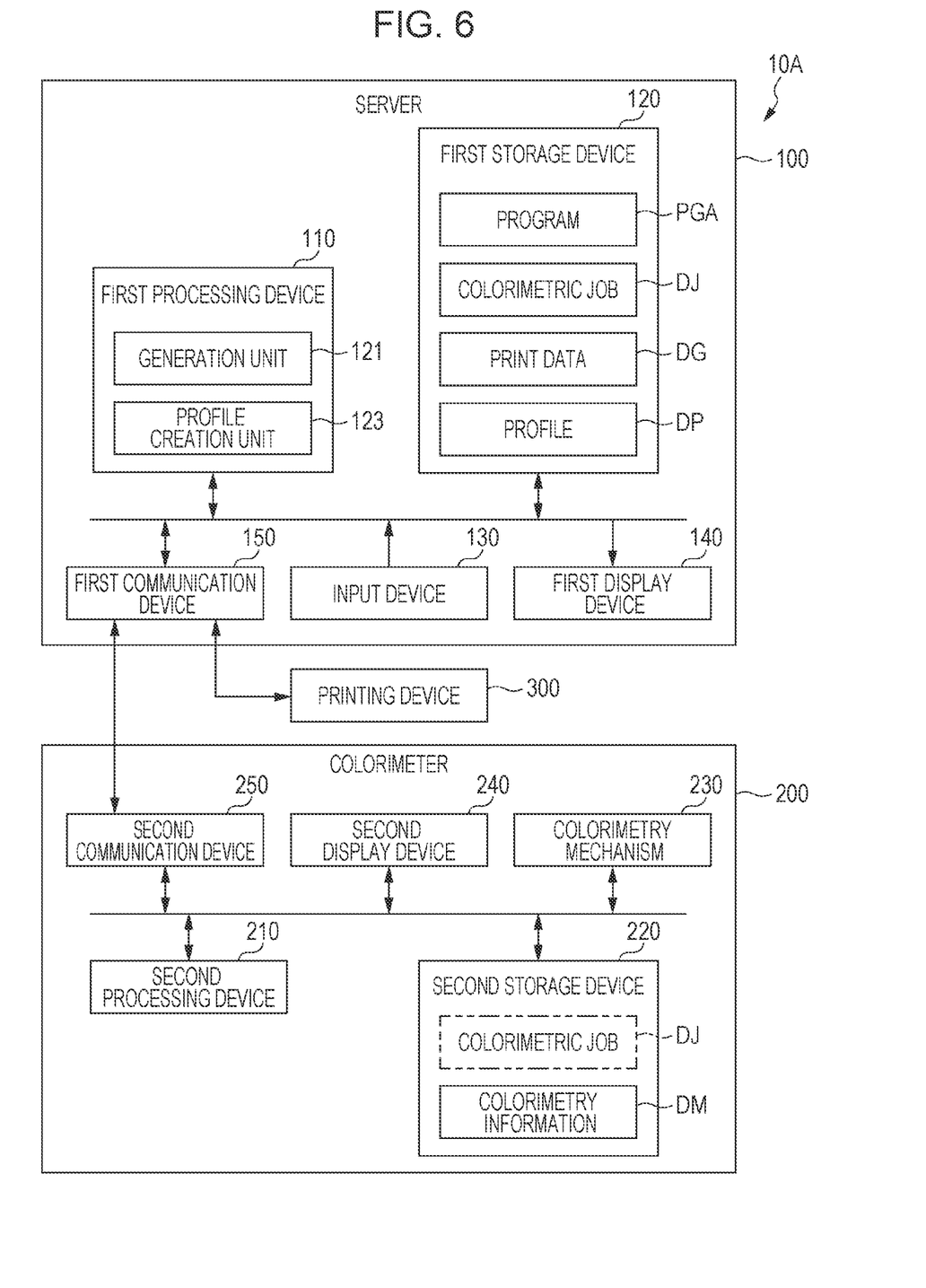
FIG. 6 is a diagram illustrating a configuration example of a colorimetric system according to the second embodiment.

FIG. 6 is a diagram illustrating a configuration example of a colorimetric system 10A according to the second embodiment. The colorimetric system 10A performs colorimetry by the colorimeter 200 based on the colorimetric job DJ generated by the server 100 on, and creates a profile DP based on the result of the colorimetry. The colorimetric system 10A is the same as the colorimetric system 10 of the first embodiment described above, except that a program PGA is used instead of the program PG.

The program PGA is executed by the first processing device 110. By this execution, the first processing device 110 functions as the generation unit 121 and the profile creation unit 123. The profile creation unit 123 creates the profile DP based on the result of colorimetry performed by the colorimeter 200. Further, the profile creation unit 123 causes the printing device 300 to perform a process of printing an image based on the print data DG before the colorimetry performed by the colorimeter 200. The printed matter produced by the printing is an object for colorimetry performed by the colorimeter 200. The print data DG of the present embodiment is, for example, image data of a colorimetry chart. Here, it is preferable that the print data DG includes data of an identification image for identifying the type of the colorimetry chart. The identification image is, for example, a QR code. The QR code is a registered trademark.

The profile DP is a profile such as an input profile, and includes a conversion table for converting a color value in one color space as an input value into a color value in another color space as an output value. The format of the profile DP is not particularly limited, but conforms to, for example, the provisions of the international color consortium (ICC). The above profile DP together with the program PGA, the colorimetric job DJ, and the print data DG is stored in the first storage device 120.

Figure 7:
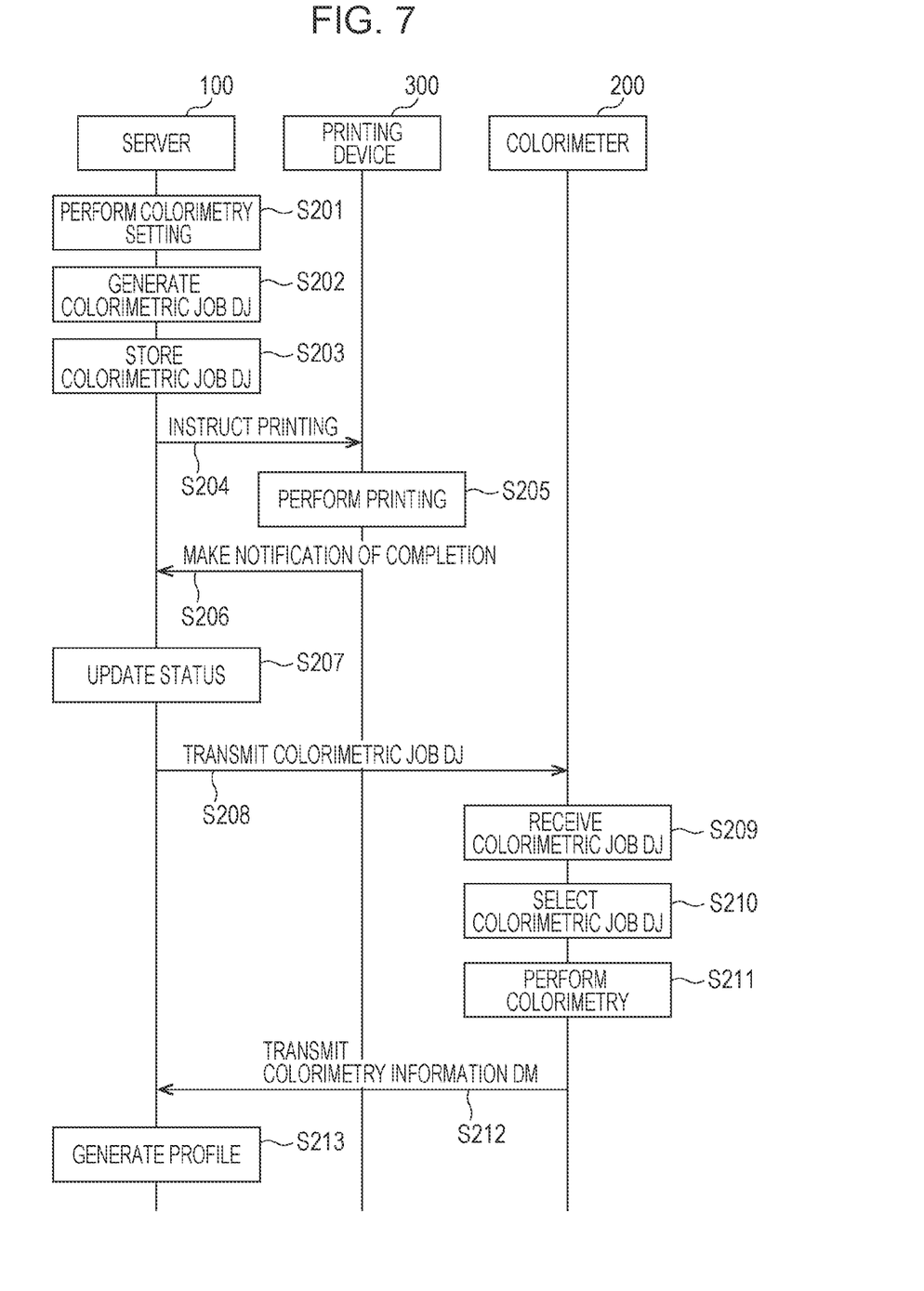
FIG. 7 is a diagram illustrating a colorimetric method according to the second embodiment.

FIG. 7 is a diagram illustrating a colorimetric method according to the second embodiment. The colorimetric method is performed using the colorimetric system 10A described above. In the colorimetric system 10A, first, as illustrated in FIG. 7, in step S201, the server 100 makes settings for colorimetry. This setting is performed in the same manner as in step S101 of the first embodiment described above.

However, in the present embodiment, the information required for generating the colorimetric job DJ includes information about the colorimetry setting of the colorimeter 200, information about the setting of the profile DP, and information about the type of the colorimetry chart. Here, the information about the setting of the profile DP is, for example, a temporary profile including information such as the type of color space used for the profile DP and information about the type of the print medium which is the object for colorimetry. In the present embodiment, when the input of the information about the setting of the profile DP is started, a job ID as an identifier for identifying the colorimetric job DJ is generated by the generation unit 121.

Next, in step S202, the server 100 generates the colorimetric job DJ. This generation is performed by the generation unit 121 based on the information set in the above-mentioned step S201, as in the above-mentioned step S102 of the first embodiment. However, in the present embodiment, the colorimetric job DJ includes information such as a chart name for identifying the colorimetry chart used for colorimetry, instead of the information about the color ID. Further, the colorimetric job DJ of the present embodiment includes a print job which is information about a process of causing the printing device 300 to perform printing a colorimetry chart.

Then, in step S203, the server 100 stores the colorimetric job DJ in the first storage device 120. Next, in step S204, the server 100 transmits a print instruction based on the above-mentioned print job to the printing device 300. This transmission is performed by the profile creation unit 123 causing the first communication device 150 to perform the process of transmitting the print instruction.

Next, in step S205, the printing device 300 performs printing based on the above-mentioned print job, that is, printing of a colorimetry chart based on the print data DG. Then, in step S206, the printing device 300 transmits a completion notification indicating that the printing is completed to the server 100.

After that, in step S207, the server 100 updates the status information indicating the progress of colorimetry based on the colorimetric job DJ. Specifically, the server 100 changes the content of the status displayed on the first display device 140 by, for example, adding information indicating that the printing of the colorimetry chart used for colorimetry was performed to the performed colorimetric job DJ. Note that step S207 may be performed as needed or may be omitted.

Next, in step S208, the server 100 transmits the colorimetric job DJ. Then, in step S209, the colorimeter 200 receives the colorimetric job DJ.

After that, in step S210, the colorimeter 200 selects the colorimetric job DJ as in step S106 of the first embodiment described above. Next, in step S211 as in step S107 of the first embodiment described above, the colorimeter 200 performs colorimetry based on the colorimetric job DJ. However, the printed matter obtained in step S205 described above is used as the object for colorimetry.

Then, in step S212, the colorimeter 200 transmits the colorimetry information DM. Next, in step S213, the server 100 creates the profile DP based on the colorimetry information DM. This creation is performed by the profile creation unit 123 using a known method.

In the second embodiment described above, colorimetry can be performed with usability superior to that in the related art. Further, in the present embodiment, in addition to the colorimetry based on the colorimetric job DJ, the profile DP is created.

Here, as described above, the server 100 has the profile creation unit 123 that creates the profile DP based on the result of the colorimetry based on the colorimetric job DJA. Therefore, the colorimetric system 10A can be provided as a profile creation system.

Further, as described above, the colorimetric job DJ includes information about the identifier of the colorimetric job DJ, the colorimetry conditions, and the colorimetry chart. Therefore, the colorimeter 200 can perform colorimetry suitable for creating the profile DP.

3. Third Embodiment

Hereinafter, the third embodiment of the present disclosure will be described. In the embodiment illustrated below, elements having the same actions and functions as those of the first embodiment will be denoted by the reference numerals used in the description of the first embodiment, and detailed description thereof will be appropriately omitted.

Figure 8:
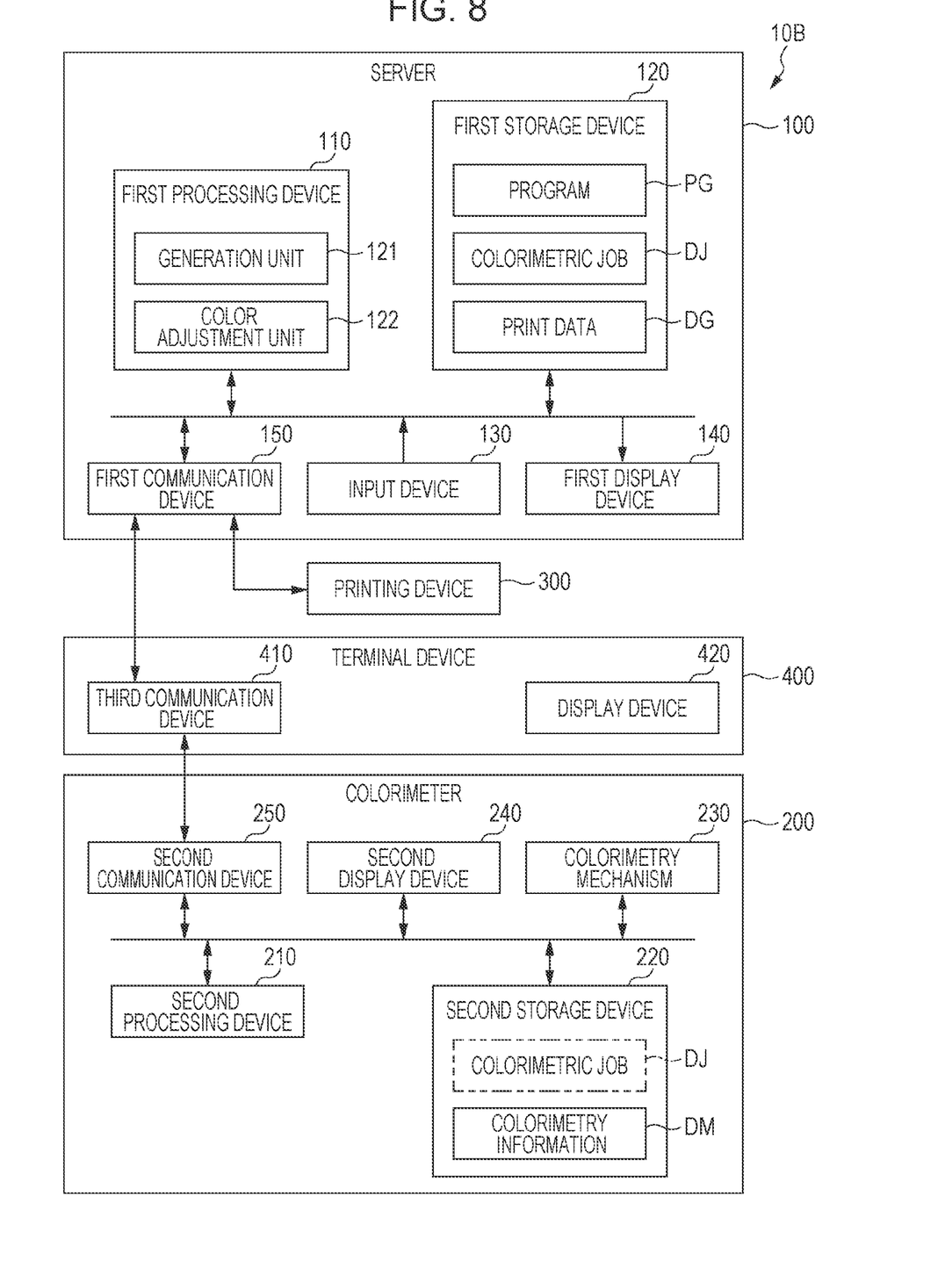
FIG. 8 is a diagram illustrating a configuration example of a colorimetric system according to the third embodiment.

FIG. 8 is a diagram illustrating a configuration example of a colorimetric system 10B according to the third embodiment. The colorimetric system 10B is the same as the colorimetric system 10 of the first embodiment described above except that a terminal device 400 is added.

The terminal device 400 is a mobile device such as a smartphone or tablet terminal having a communication function and a display function. The terminal device 400 includes a third communication device 410, which is an example of a "third communication unit", and a display device 420.

The third communication device 410 is a communication circuit communicatively connected to each of the server 100 and the colorimeter 200. In the present embodiment, the third communication device 410 functions as a relay that relays communication between the server 100 and the colorimeter 200. The third communication device 410 is wirelessly connected to each of the server 100 and the colorimeter 200 by, for example, Wi-Fi or Bluetooth.

The display device 420 is composed of various display panels such as a liquid crystal display panel or an organic electro-luminescence (EL) display panel, for example. As in the second display device 240, the display device 420 displays, for example, an image indicating an operation instruction or operation content of colorimetry based on the colorimetric job DJ.

In the above-mentioned third embodiment, colorimetry can be performed with usability superior to that in the related art. As described above, the colorimetric system 10 of the present embodiment includes the terminal device 400. The terminal device 400 includes the third communication device 410, which is an example of a "third communication unit" that communicates with the second communication device 250. Therefore, even when the second communication device 250 cannot directly communicate with the first communication device 150, in a case where the third communication device 410 can communicate with the first communication device 150, it is possible to perform communication between the first communication device 150 and the second communication device 250 via the third communication device 410. Further, even when the colorimeter 200 does not have a display function, in a case where the terminal device 400 has a display function, it is possible to display the content of the colorimetric job DJ on the terminal device 400.

In the present embodiment, the second communication device 250 receives the colorimetric job DJ from the first communication device 150 via the third communication device 410. Therefore, even when the second communication device 250 cannot directly communicate with the first communication device 150, the second communication device 250 can receive the colorimetric job DJ.

The terminal device 400 displays the content of the colorimetric job DJ. Therefore, even when the colorimeter 200 does not have a display function, it is possible to present the content of the colorimetric job DJ to the operator of the colorimeter 200 by displaying it on the terminal device 400.

4. Fourth Embodiment

Hereinafter, the fourth embodiment of the present disclosure will be described. In the embodiment illustrated below, elements having the same actions and functions as those of the first embodiment will be denoted by the reference numerals used in the description of the first embodiment, and detailed description thereof will be appropriately omitted.

Figure 9:
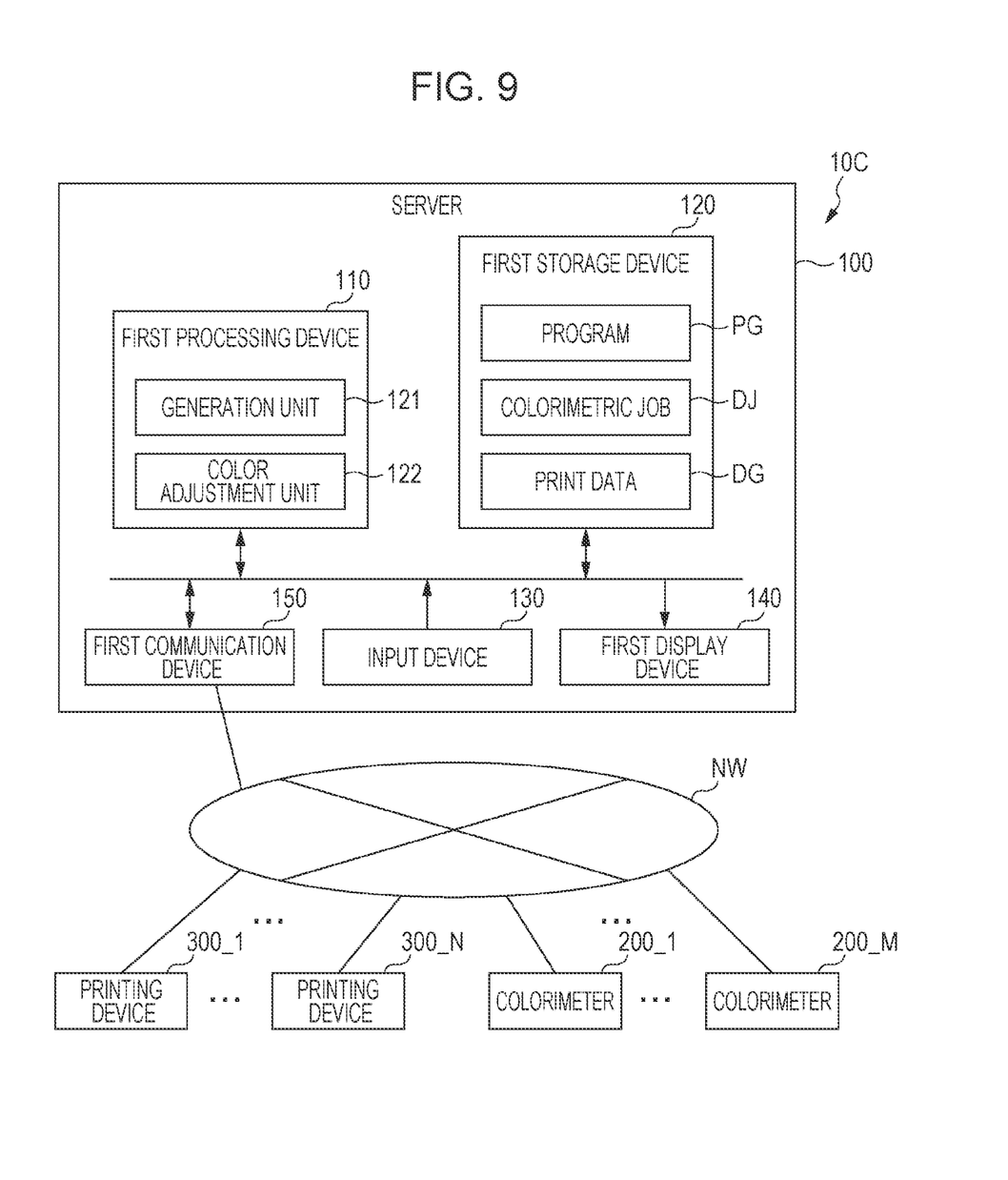
FIG. 9 is a diagram illustrating a configuration example of a colorimetric system according to the fourth embodiment.

FIG. 9 is a diagram illustrating a configuration example of a colorimetric system 10C according to the fourth embodiment. The colorimetric system 10C is the same as the colorimetric system 10 of the first embodiment described above except that the number of the colorimeters 200 and the number of the printing devices 300 that are communicably connected to the server 100 are plural. FIG. 9 illustrates a configuration in which M colorimeters 200_1 to 200_M and N printing devices 300_1 to 300_N are connected to the server 100 via a network NW. Here, each of the colorimeters 200_1 to 200_M is the colorimeter 200. Each of the printing devices 300_1 to 300_N is the printing device 300. The network NW is a network such as a LAN or the Internet. Each of M and N is an integer of 2 or more.

Figure 10:
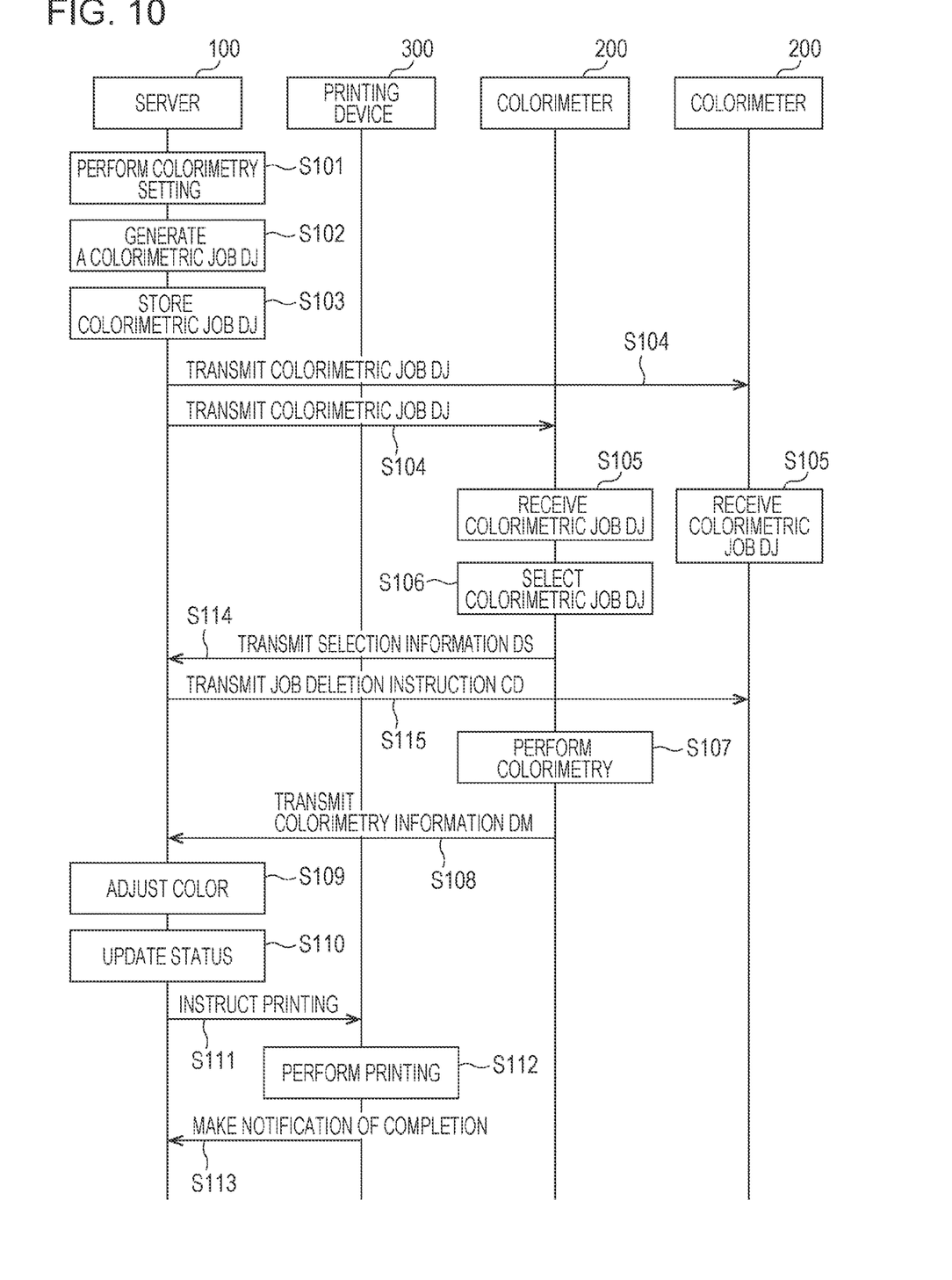
FIG. 10 is a diagram illustrating a colorimetric method according to the fourth embodiment.

FIG. 10 is a diagram illustrating a colorimetric method according to the fourth embodiment. The colorimetric method is performed using the colorimetric system 10C described above. In FIG. 10, for convenience of explanation, two colorimeters 200 of the M colorimeters 200_1 to 200_M and one printing device 300 of the N printing devices 300_1 to 300_N are representatively illustrated. In the colorimetric system 10C, as illustrated in FIG. 10, steps S101 to S105 are performed as in the first embodiment described above.

However, in step S104, the server 100 transmits the colorimetric job DJ to each of the M colorimeters 200_1 to 200_M. Then, in step S105, each of the M colorimeters 200_1 to 200_M receives the colorimetric job DJ.

Then, in step S106, one colorimeter 200 of the M colorimeters 200_1 to 200_M selects the colorimetric job DJ. In step S114, the one colorimeter 200 transmits selection information DS indicating the selection to the server 100. The server 100 that has received the selection information DS transmits a job deletion instruction CD, which is an example of a "command" for deleting the colorimetric job DJ, to the colorimeter(s) 200 excluding the sender of the selection information DS among the M colorimeters 200_1 to 200_M. The job deletion instruction CD may be performed after step S107, and in this case, the colorimetry information DM may also serve as the job deletion instruction CD.

Next, in step S107, the colorimeter 200 that selects the colorimetric job DJ performs colorimetry based on the colorimetric job DJ. After that, in step S108, the colorimeter 200 that has selected the colorimetric job DJ transmits the colorimetry information DM.

Next, steps S109 to S113 are performed as in the first embodiment described above. As described above, the colorimetry based on the colorimetric job DJ and the color adjustment of the print data DG are performed.

In the above-mentioned fourth embodiment, colorimetry can be performed with usability superior to that in the related art. As described above, the colorimetric system 10C of the present embodiment includes a plurality of colorimeters 200, and the first communication device 150 transmits the colorimetric job DJ to each of the plurality of colorimeters 200. Therefore, the colorimetry based on the colorimetric job DJ may be performed by any colorimeter 200 of the plurality of colorimeters 200. Therefore, there is an advantage that a time required from the generation of the colorimetric job DJ to the execution of the colorimetry based on the colorimetric job DJ can be easily shortened as compared with a time in the configuration in which the number of colorimeters 200 is one. Further, among the plurality of colorimeters 200, the colorimeter 200 suitable for colorimetry based on the colorimetric job DJ can be selectively used. Therefore, there is an advantage that the quality of colorimetry based on the colorimetric job DJ can be easily improved.

Further, the second communication device 250 transmits, to the first communication device 150, the selection information DS, which is an example of "colorimetry execution information" indicating that the colorimetric job DJ is scheduled to be performed or was performed, when the colorimetry mechanism 230 performs colorimetry based on the colorimetric job DJ. On the other hand, when the first communication device 150 receives the selection information DS, the first communication device 150 transmits, to the colorimeter(s) 200 that has not transmitted the selection information DS among the plurality of colorimeters 200, the job deletion instruction CD, which is an example of a "command" for deleting the colorimetric job DJ. Therefore, it is possible to prevent the performed colorimetric job DJ from being duplicately performed by the plurality of colorimeters 200.

5. Modification

Each form in the above examples can be variously modified. Specific modifications that can be applied to the above-described embodiments are described below. Two or more aspects of any selected from the following examples can be appropriately combined as long as they do not contradict each other.

5-1. Modification 1

Figure 11:
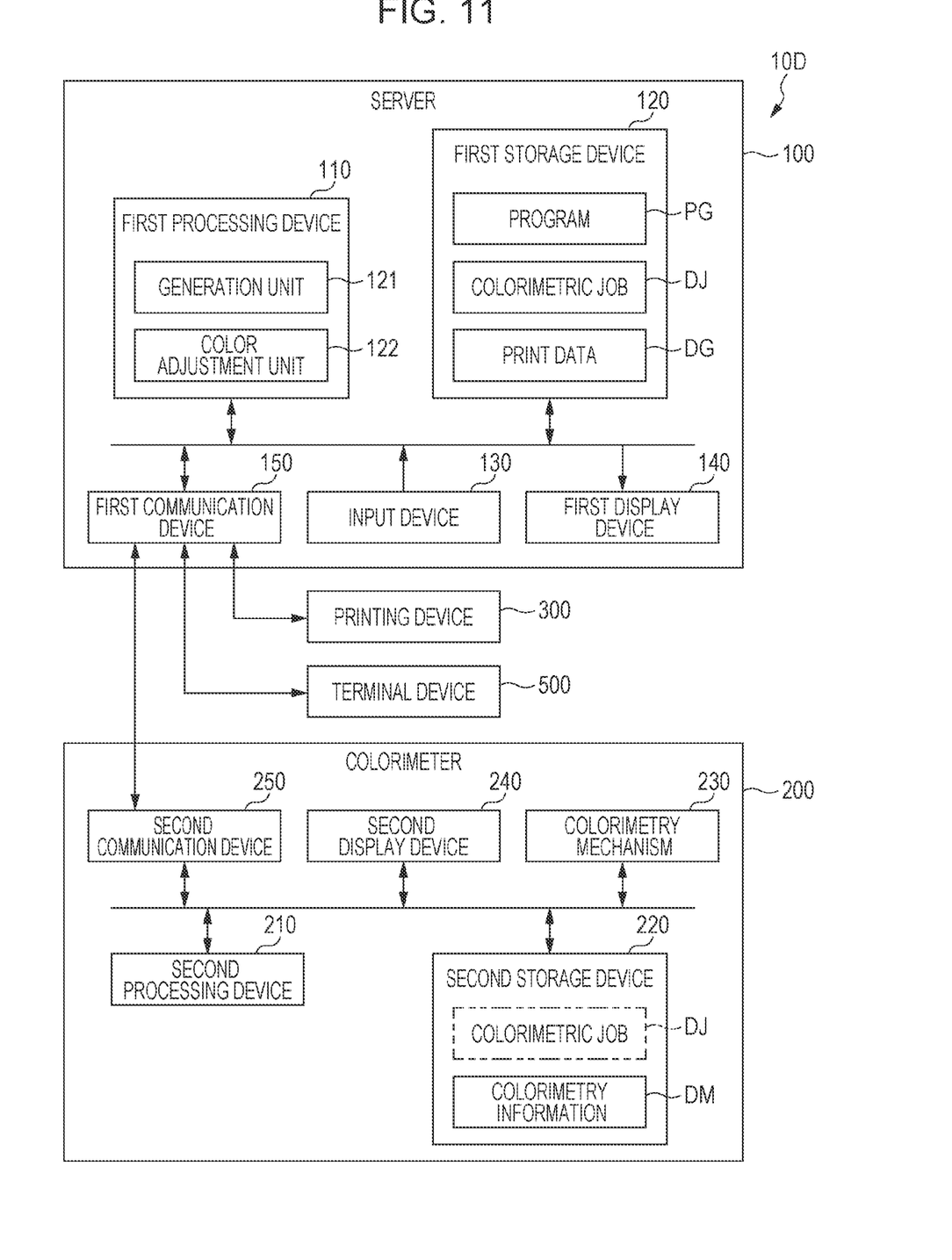
FIG. 11 is a diagram illustrating a configuration example of a colorimetric system according to Modification 1.

FIG. 11 is a diagram illustrating a configuration example of a colorimetric system 10D according to Modification 1. The colorimetric system 10D is the same as the colorimetric system 10 of the first embodiment described above except that a terminal device 500 is added.

The terminal device 500 is a computer having a communication function and a display function. In the example illustrated in FIG. 11, the terminal device 500 is communicably connected to the server 100. In such a colorimetric system 10D, the server 100 may be a cloud server. Therefore, by operating the terminal device 500, the server 100 can be set for colorimetry. In this case, the display used for the setting can be performed by the terminal device 500.

5-2. Modification 2

Figure 12:
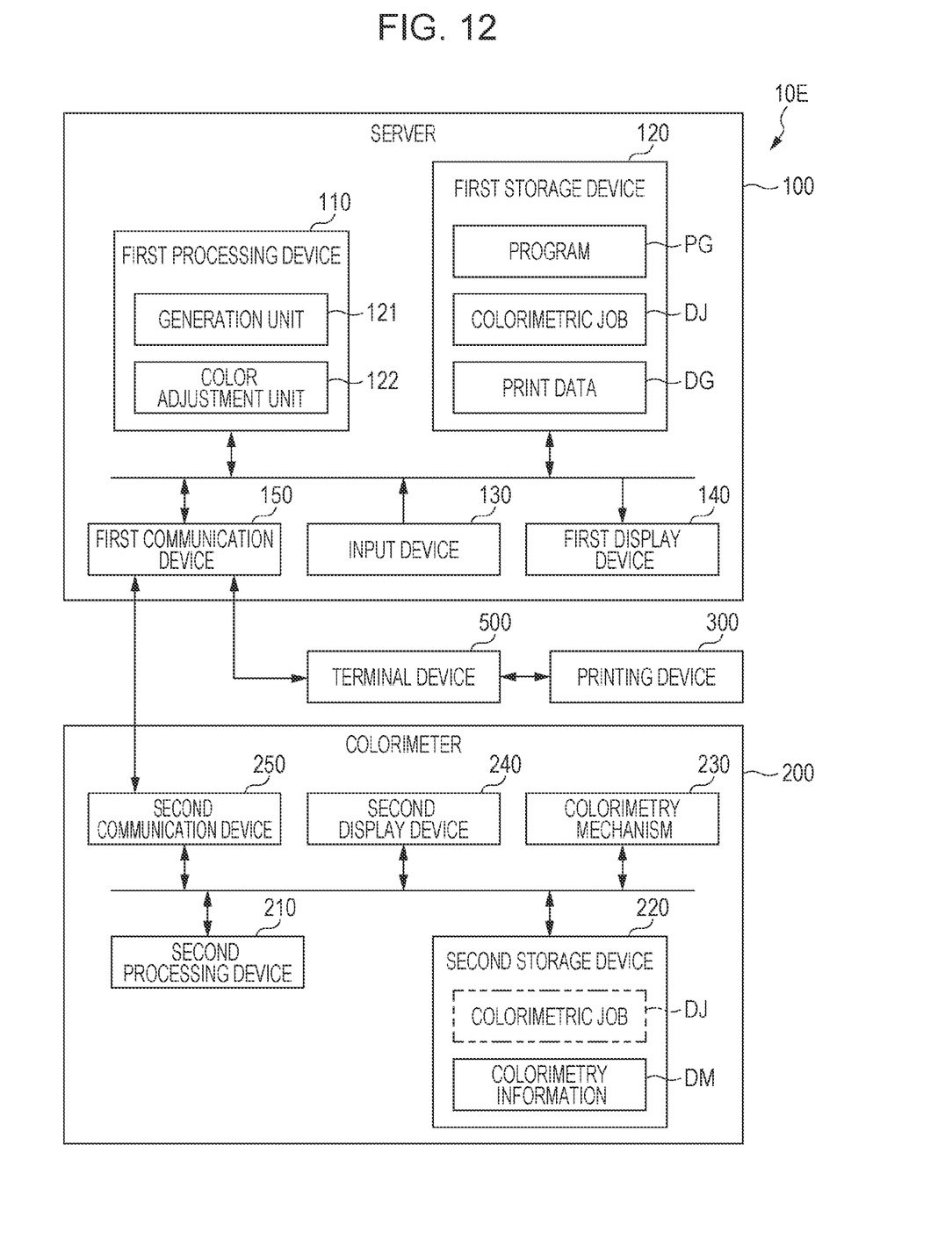
FIG. 12 is a diagram illustrating a configuration example of a colorimetric system according to Modification 2.

FIG. 12 is a diagram illustrating a configuration example of a colorimetric system 10E according to Modification 2. The colorimetric system 10E is the same as the colorimetric system 10 of the first embodiment described above except that the terminal device 500 is added.

In the example illustrated in FIG. 12, the server 100 and the printing device 300 are communicably connected with each other via the terminal device 500. In the colorimetric system 10E having such a configuration, as in Modification 1 described above, the server 100 can be set for colorimetry by operating the terminal device 500, or the terminal device 500 performs display used for the setting.

5-3. Modification 3

In the above-described embodiments, a configuration in which not only the colorimetry based on the colorimetric job DJ is performed but also the color adjustment or profile creation is performed using the result of the colorimetry is exemplified, but the embodiments are not limited to the configuration and only the colorimetry based on the colorimetric job DJ may be performed without performing the color adjustment or profile creation.

5-4. Modification 4

In each embodiment except the second embodiment described above, a configuration in which color adjustment is performed using the result of colorimetry based on the colorimetric job DJ is exemplified, but the embodiments are not limited to the configuration and instead of the color adjustment, the profile same as that in the second embodiment may be created.

What is claimed is:
1. A colorimetric method comprising:
   a server generating a colorimetric job including information about an instruction to perform colorimetry, a colorimetry measurement condition, an identifier of the colorimetric job, a colorimetry condition, and a colorimetry chart;

the server storing the colorimetric job;
the server transmitting the colorimetric job;
a colorimeter receiving the colorimetric job; and
the colorimeter performing colorimetry based on the colorimetric job when the colorimetric job is selected by the colorimeter.

2. A colorimetric system comprising:
a server; and a colorimeter, wherein
the server includes
   a generation unit that generates a colorimetric job including information about an instruction to perform colorimetry, a colorimetry measurement condition, an identifier of the colorimetric job, a colorimetry condition, and a colorimetry chart,
   a storage unit that stores the colorimetric job, and
   a first communication unit that transmits the colorimetric job, and wherein the colorimeter includes
   a second communication unit that receives the colorimetric job and
   a colorimetry unit that performs colorimetry based on the colorimetric job when the colorimetric job is selected.

3. The colorimetric system according to claim 2, wherein the first communication unit transmits the colorimetric job to each of a plurality of the colorimeters.

4. The colorimetric system according to claim 3, wherein when the colorimetry unit performs colorimetry based on the colorimetric job, the second communication unit transmits colorimetry execution information indicating that the colorimetric job is scheduled to be performed or was performed to the first communication unit, and wherein
when receiving the colorimetry execution information, the first communication unit transmits a command to delete the colorimetric job to the colorimeter that does not transmit the colorimetry execution information among the plurality of colorimeters.

5. The colorimetric system according to claim 2, further comprising
   a terminal device having a third communication unit that communicates with the second communication unit.

6. The colorimetric system according to claim 5, wherein the second communication unit receives the colorimetric job from the first communication unit via the third communication unit.

7. The colorimetric system according to claim 5, wherein the terminal device displays a content of the colorimetric job.

8. The colorimetric system according to claim 2, wherein the server includes a first display device that displays a content of the colorimetric job, and wherein
the colorimeter includes a second display device that displays a content of the colorimetric job.

9. The colorimetric system according to claim 2, wherein the server includes a color adjustment unit that performs a color adjustment of image data based on an execution result of colorimetry based on the colorimetric job.

10. The colorimetric system according to claim 2, wherein the server includes a profile creation unit that creates a profile based on an execution result of colorimetry based on the colorimetric job.

11. A colorimetric system comprising:
a server; and a colorimeter, wherein
the server includes
   a generation unit that generates a colorimetric job including information about an instruction to perform colorimetry and a colorimetry measurement condition,
   a storage unit that stores the colorimetric job, and
   a first communication unit that transmits the colorimetric job to each of a plurality of colorimeters, and wherein each colorimeter of the plurality of colorimeters includes
   a second communication unit that receives the colorimetric job and
   a colorimetry unit that performs colorimetry based on the colorimetric job when the colorimetric job is selected,
wherein
when the colorimetry unit performs colorimetry based on the colorimetric job, the second communication unit transmits colorimetry execution information indicating that the colorimetric job is scheduled to be performed or was performed to the first communication unit, and
when receiving the colorimetry execution information, the first communication unit transmits a command to delete the colorimetric job to the colorimeter that does not transmit the colorimetry execution information among the plurality of colorimeters.

12. A colorimetric system comprising:
a server; and a colorimeter, wherein
the server includes
a generation unit that generates a plurality of colorimetric jobs including information about a colorimetry setting which specifies measurement condition of the colorimeter,
a storage unit that stores the plurality of colorimetric jobs, and
a first communication unit that transmits the plurality of colorimetric jobs, and wherein
the colorimeter includes
a second communication unit that receives the plurality of colorimetric jobs and
a colorimetry unit that performs colorimetry based on the colorimetry setting included in one colorimetry job selected from the plurality of colorimetry jobs received by the second communication unit.

13. The colorimetric system according to claim 12, wherein
the colorimetry setting includes at least one of M factor, the light source, the number of colorimetry objects, the number of colorimetry repetitions.

* * * * *